(12) United States Patent
Kuffner et al.

(10) Patent No.: US 11,993,119 B2
(45) Date of Patent: May 28, 2024

(54) ROBOT HAVING MULTIPLE WHEEL SETS

(71) Applicant: TOYOTA JIDOSHA KABUSHIKI KAISHA, Aichi-ken (JP)

(72) Inventors: James Kuffner, Tokyo (JP); Satoshi Kagami, Tokyo (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 294 days.

(21) Appl. No.: 17/412,274

(22) Filed: Aug. 26, 2021

(65) Prior Publication Data
US 2023/0064738 A1    Mar. 2, 2023

(51) Int. Cl.
*B60G 17/0165* (2006.01)
*B60S 1/68* (2006.01)
*B60W 60/00* (2020.01)

(52) U.S. Cl.
CPC ............ *B60G 17/0165* (2013.01); *B60S 1/68* (2013.01); *B60G 2300/26* (2013.01); *B60G 2500/30* (2013.01); *B60W 60/00256* (2020.02)

(58) Field of Classification Search
None
See application file for complete search history.

(56) References Cited

U.S. PATENT DOCUMENTS

| | | | |
|---|---|---|---|
| 3,653,332 A * | 4/1972 | Olson, Sr. ............... | B60F 1/005 105/72.2 |
| 4,498,207 A * | 2/1985 | Rosendall ............... | A47L 11/33 15/42 |
| 6,394,743 B1 * | 5/2002 | Marsden ................. | B62B 3/008 414/812 |
| 9,079,466 B2 * | 7/2015 | Bailey .................... | B60F 3/0007 |
| 11,091,182 B1 * | 8/2021 | Lwali ..................... | B62B 13/18 |
| 2008/0060150 A1 * | 3/2008 | Dollhopf ................. | B60S 3/06 15/53.1 |
| 2008/0258451 A1 * | 10/2008 | Thygesen ............... | A61G 5/10 280/855 |
| 2008/0265821 A1 * | 10/2008 | Theobald ............... | B62D 57/028 901/1 |
| 2010/0011986 A1 | 1/2010 | Pumpelly | |
| 2010/0152922 A1 * | 6/2010 | Carlson .................. | B62D 57/02 180/218 |
| 2010/0307531 A1 * | 12/2010 | Aharonov ............... | B60S 3/041 134/123 |

(Continued)

FOREIGN PATENT DOCUMENTS

| | | | | |
|---|---|---|---|---|
| CN | 109589049 A | * | 4/2019 | ............. A47L 11/24 |
| JP | 2019034265 A | * | 3/2019 | |

*Primary Examiner* — Justin S Lee
(74) *Attorney, Agent, or Firm* — HAUPTMAN HAM, LLP

(57) ABSTRACT

A robot includes a body having an internal opening. The robot further includes a first wheel configured to deploy out of the internal opening and to retract into the internal opening. The robot further includes a second wheel configured to deploy out of the internal opening and to retract into the internal opening. The robot further includes a sensor configured to determine a location of the robot. The robot further includes a controller configured to control each of the first wheel and the second wheel, wherein in response to the location of the robot being at a predetermined location, the controller is configured to cause the second wheel to deploy out of the internal opening and to cause the first wheel to retract into the internal opening.

20 Claims, 9 Drawing Sheets

(56) References Cited

U.S. PATENT DOCUMENTS

| | | | |
|---|---|---|---|
| 2014/0158439 A1 | 6/2014 | Kim et al. | |
| 2015/0274214 A1* | 10/2015 | Riddick | B62D 25/182 |
| | | | 29/434 |
| 2016/0339879 A1 | 11/2016 | Hirata et al. | |
| 2019/0365585 A1* | 12/2019 | Hacikadiroglu | A61G 5/042 |
| 2020/0064852 A1* | 2/2020 | Sibley | B60P 3/007 |
| 2020/0283080 A1* | 9/2020 | Rudakevych | B62D 55/075 |
| 2021/0109530 A1* | 4/2021 | Inoue | B62D 61/12 |
| 2022/0308586 A1* | 9/2022 | Bergman | G07C 9/22 |

\* cited by examiner

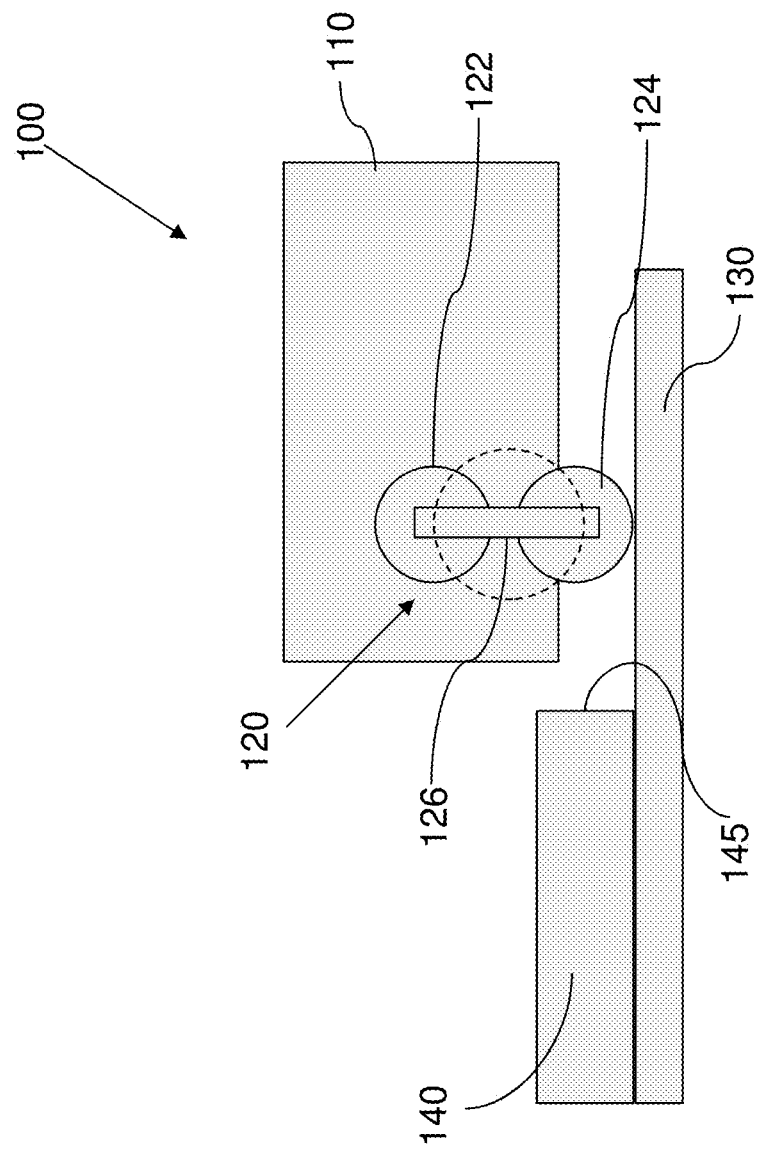

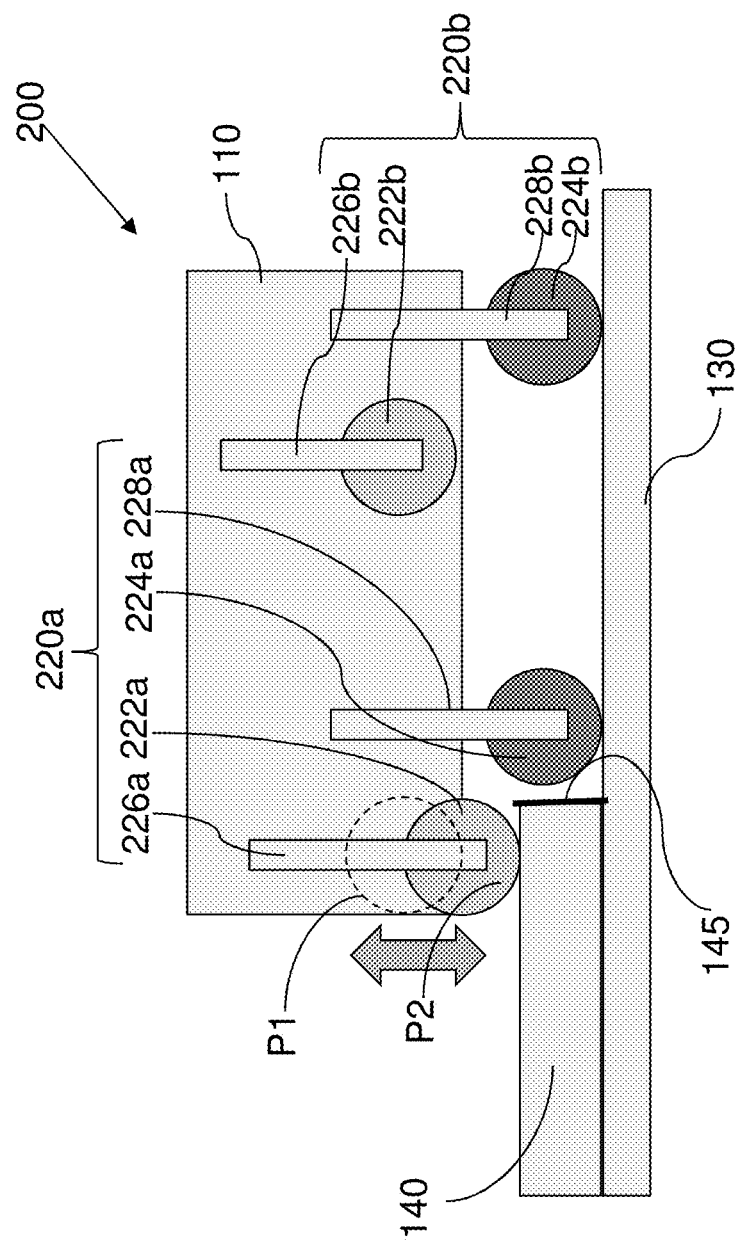

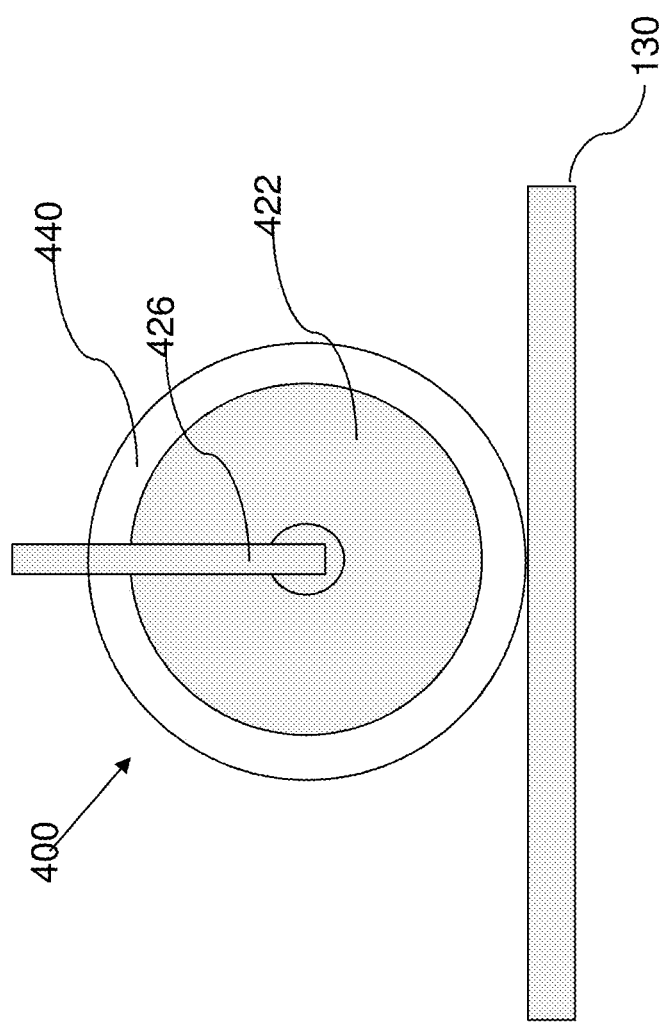

US 11,993,119 B2

ROBOT HAVING MULTIPLE WHEEL SETS

BACKGROUND

Online ordering and delivery of goods is increasing as people seek to avoid traveling to stores. In addition, concerns over cleanliness are also paramount in today's society. As a result, many delivery services offer contact-less delivery services. In these contact-less delivery services packages are left outside of the dwelling. This increases the risk of spoilage of products within the package or potential theft of the package. A delivery service which enters the dwelling to deliver the package increases the risk of dirt, debris, bacteria, viruses or other matter entering the dwelling.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1A is a side view of a robot in an entry way of a dwelling in accordance with some embodiments.

FIG. 2 is a side view of a robot in an entry way of a dwelling in accordance with some embodiments.

FIG. 4 is a side view of a wheel arrangement for a robot in accordance with some embodiments.

DETAILED DESCRIPTION

Figure 1C:
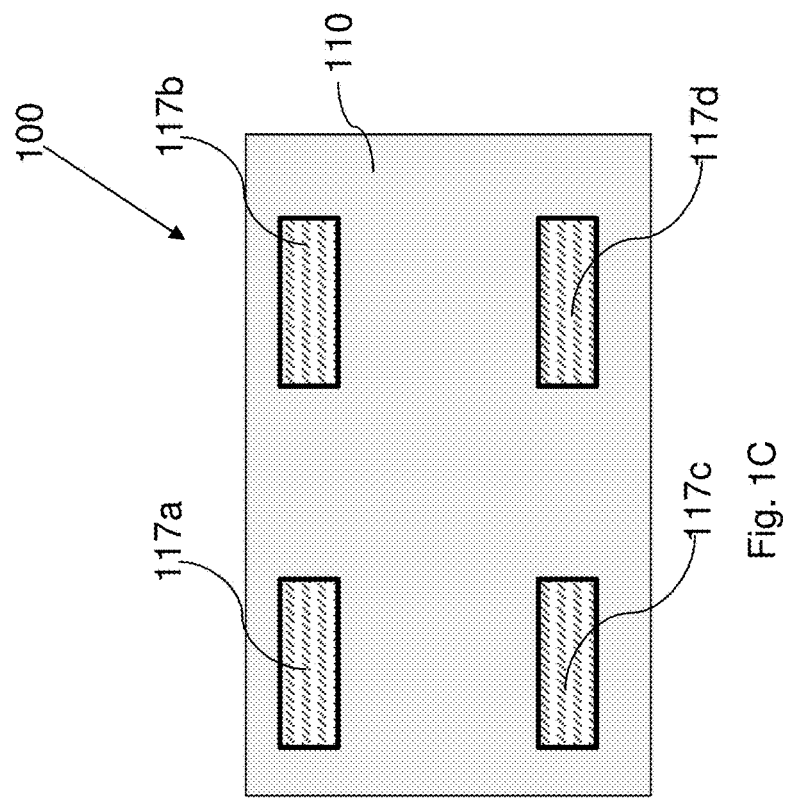
FIG. 1C is a bottom view of a robot in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Robot and drone delivery are increasing as online shopping increases and delivery companies seek to automate deliver processors. For example, in the planned Toyota Smart City, robots are expected to deliver packages from a distribution center to a dwelling of a person. In some embodiments, the dwelling is a home of the person or an office at which the person works. In some embodiments, the home includes a single-family home, a townhouse, an apartment or another location. In some instances, the robot will be expected to enter the dwelling of the person in order to deliver the package. In some embodiments, the robot will place the package in a designated location, such as a refrigerator or pantry, within the dwelling. The entry into the dwelling will increase the risk of dirt, debris, bacteria, virus and other contaminants entering the dwelling. According to the current disclosure the robot is equipped with wheel exchanging features and/or wheel cleaning features in order to reduce the risk of contaminants from entering at least parts of the dwelling.

To help maintain cleanliness within the dwelling, in some embodiments, the robot is equipped with two sets of wheels. One set of wheels is for indoor use, while the other set of wheels is for outdoor use. The robot will travel from the distribution center to the dwelling using the outdoor wheels. Once the robot reaches the dwelling, the robot will switch from the outdoor wheels to the indoor wheels in one of several ways.

Additionally, many dwellings includes entry area or foyers where shoes are removed. In some instances, these entry areas are separated from other portions of the dwelling by a step in order to help maintain cleanliness of the dwelling. In order to deliver packages beyond the entry way, the robot will be able to identify a step, if present, and traverse the step to enter other areas of the dwelling.

FIG. 1A is a side view of a robot 100 in an entry way in accordance with some embodiments. The robot 100 includes a body 110 and a wheel arrangement 120. FIG. 1A includes a single wheel arrangement 120 for the sake of clarity. One of ordinary skill in the art would recognize that the robot 100 is capable of having multiple wheel arrangements. For example, in some embodiments, the robot 100 includes three or four wheel arrangements. The robot 100 is on a floor 130 of the entry way. A step 140 separates the floor 130 from other portions of the dwelling. A step face 145 extends between a level of the dwelling at the step 140 and a top surface of the floor 130. The wheel arrangement 120 includes a first wheel 122 and a second wheel 124 connected by a connector 126. The connector 126 is configured to rotate about a central axis in order to permit selectively deployment of either the first wheel 122 or the second wheel 124.

The body 110 is usable to partially house the wheel arrangement 120. The body 110 further includes a power source, such as a rechargeable battery, for powering the wheel arrangement 120 and other elements within the body 110. The body 110 further includes a controller configured to control operation of the robot 100. The body 110 further includes elements usable to determine a location of the robot 100, such as a global positioning system (GPS), an antenna, optical equipment, a radio frequency (RF) detector, an infrared (IR) detector, or other suitable position determining elements. In some embodiments, the body 110 includes a conveyor, such as an arm or a conveyor belt, to inserting and removing the package from the robot 100. In some embodiments, the body 110 includes a communication device, such as a speaker or a display, for providing information to people. In some embodiments, the body 110 includes a light source of illuminating surroundings of the robot 100. In some embodiments, the body 110 has a rectangular shape. In some embodiments, the body 110 has a shape other than a rectangle. In some embodiments, the body 110 includes a soft or padded exterior to reduce a risk of damage to an interior of a dwelling or to other objects contacted by the robot 100. In some embodiments, the body 110 includes a tray configured to capture debris from the first wheel 122 or the second wheel 124 while retracted inside the body 110.

In some embodiments, at least one of the first wheel 122 or the second wheel 124 is located within the body at any one time. In some embodiments, the body 110 further configured to house a package to be delivered to the dwelling. In some embodiments, the body 110 is configured to house the package in a manner which shields the package from external elements, such as rain, snow or other debris. In some embodiments, the body 110 is configured to support a package to be delivered on a top surface of the body 110. In some embodiments, the body 110 includes a thermally insulated compartment configured to help maintain a temperature of the package to be delivered. In some embodiments, the body 110 includes a heated compartment configured to supply heat to the package to be delivered. In some embodiments, the body 110 includes a cooled compartment configured to refrigerate the package to be delivered.

The wheel arrangement 120 is usable to propel the robot 100 from a distribution center, where a package is received, to and inside a designated dwelling, where the package is delivered. The wheel arrangement 120 is configured to selectively deploy the first wheel 122 or the second wheel 124 based on a detected location of the robot 100. In some embodiments, the first wheel 122 is used to propel the robot 100 within the dwelling. In some embodiments, the second wheel 124 is used to propel the robot 100 outside of the dwelling. In some embodiments, the first wheel 122 and the second wheel 124 independently include rubber, plastic or another suitable material. In some embodiments, the first wheel 122 and the second wheel 124 include a same material. In some embodiments, the first wheel 122 includes a softer material than the second wheel 124. The softer material of the first wheel 122 reduces a risk of damaging the floor 130 or other surfaces in the dwelling. The harder material of the second wheel 124 helps to reduce wear on the second wheel 124 while traveling along outside surfaces, such as roadways and sidewalks.

The connector 126 is connected to both the first wheel 122 and the second wheel 124. The connector 126 is configured to rotate about a central axis of the connector 126 in order to change a position of the first wheel 122 and the second wheel 124 in order to selectively deploy the first wheel 122 or the second wheel 124. In some embodiments, the connector 126 is inside of the body 110. In some embodiments, the connector 126 protrudes to outside of the body 110. In some embodiments, a portion of the body 110 rotates with the connector 126. In some embodiments, the connector 126 is configured to adjust a distance between the first wheel 122 and the second wheel 124. For example, in some embodiments, the connector 126 is configured to increase the distance between the first wheel 122 and the second wheel 124 in order to increase a distance between the floor 130 and the body 110 in order for the robot 100 to traverse the step 140.

The floor 130 is a surface inside of the dwelling or adjacent to the step 140. In some embodiments, the floor 130 is at an entry way or foyer of the dwelling. In some embodiments, the floor 130 is in a lobby of the dwelling. In some embodiments, the floor 130 includes a hard surface, such as wood or tile. In some embodiments, a rug or carpet at least partially covers the floor 130.

The step 140 separates the floor 130 from other areas of the dwelling. The step 140 in FIG. 1A is a step up. In some embodiments, the step 140 is a step down. The step face 145 is at a transition from the floor 130 to the step 140. In some embodiments, the step 140 is a same level as the floor 130 and the step face 145 is a threshold or demarcation between the floor 130 and the step 140. The step face 145 helps the robot 100 to identify a transition from the floor 130 to the step 140. For example, in some embodiments, the step face includes identifying information to help the robot 100 determine a height, direction (up or down), and/or precise location of the step 140. In some embodiments, the identifying information includes a radio frequency identification (RFID) tag readable by the robot 100, e.g., using an RF detector in the body 110. In some embodiments, the identifying information includes an optically detectable sign, such as a symbol, Q-code, barcode, or other suitable sign, detectable by the robot 100, e.g., using an optical detector in the body 110. In some embodiments, the robot 100 is able to identify the step face 145 based on an image captured, e.g., by an optical detector in the body 110, by the robot 100.

Upon detection of the step face 145 the controller within the body 110 controls the wheel arrangement 120 to position the robot 100 proximate the step face 145. The controller then controls the wheel arrangement 120 to deploy the first wheel 122 by rotating the connector 126 about the central axis. As a result, the first wheel 122 is moved from inside the body 110 to outside of the body 110; and the second wheel 124 is moved from outside the body 110 to inside of the body 110. In some embodiments, the first wheel 122 is deployed prior to the robot 100 traversing the step 140, i.e., the first wheel 122 is deployed onto the floor 130. In some embodiments, the first wheel 122 is deployed onto the surface of the step 140, so that the first wheel 122 does not contact the floor 130.

Once the robot 100 has traversed the step 140, the robot 100 will proceed into the other areas of the dwelling on the first wheel 122 to a location within the dwelling where the package is to be delivered. The robot 100 then returns to the step 140. The robot 100 then traverses the step 140 to return to the floor 130 and deploys the second wheel 124. The robot 100 then exits the dwelling and either returns to the distribution center or to a next dwelling along a delivery route.

Figure 1B:
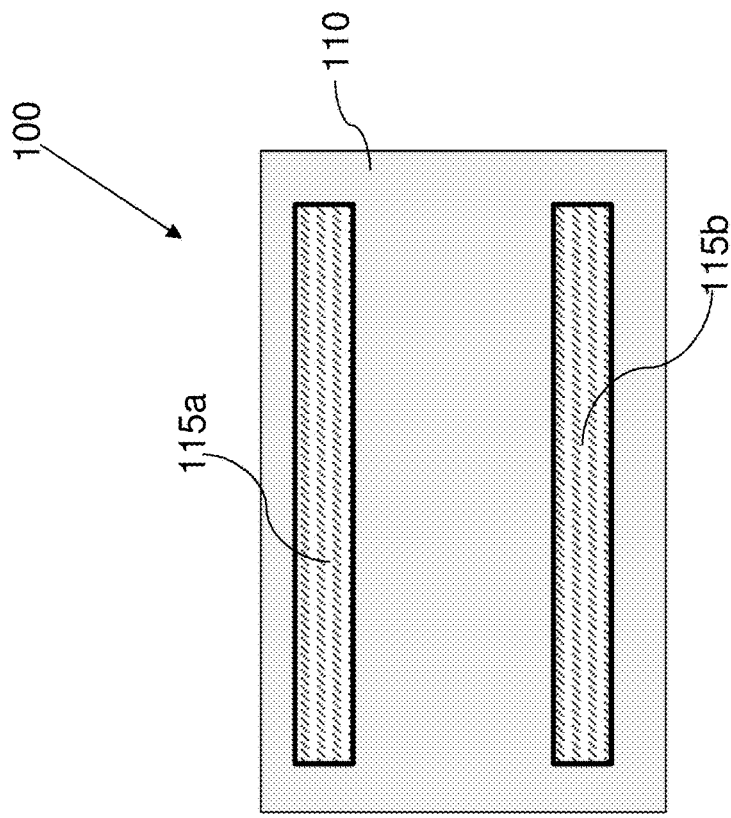
FIG. 1B is a bottom view of a robot in accordance with some embodiments.

FIG. 1B is a bottom view of the robot 100 in accordance with some embodiments. The body 110 includes a first opening 115a extending along a first side of the bottom surface of the body 110. The body 110 further includes a second opening 115b extending along a second side of the bottom surface of the body 110. The first opening 115a and the second opening 115b, collectively called openings 115, extend along a majority of the bottom surface of the body 110. The openings 115 provide access between an interior of the body 110 and an exterior of the body 110. The openings 115 permit the wheel arrangement 120 to selectively deploy the first wheel 122 or the second wheel 124. In some embodiments, multiple wheel arrangements 120 are positioned along each of the openings 115. For example, in some embodiments, the robot 100 includes four wheel arrangements 120 and two wheel arrangements 120 are associated with each of the openings 115.

In some embodiments, the openings 115 include a door configured to open during switching between the first wheel 122 and the second wheel 124; and then close once the switching is completed. In this manner the wheel inside of the body 110 is protected from the external environment and/or is less likely to drop debris inside the dwelling while moving within the dwelling. In some embodiments, the openings 115 include a brush or flexible flap within the openings 115. The brush or flexible flap helps to remove debris from the wheels during the switching. In some embodiments, the brush or flexible flap is less effective at preventing debris from entering the dwelling than a door on the openings 115; however, the brush or flexible flap occupies less space and does not include moving parts which have a risk of breaking over time and preventing the switching of the wheels.

FIG. 1C is a bottom view of the robot 100 in accordance with some embodiments. In contrast to FIG. 1B, FIG. 1C includes a first opening 117a, a second opening 117b, a third opening 117c and a fourth opening 117d, collectively called openings 117. In contrast with openings 115, the opening 117 are shorter and a located proximate to corners of the body 110. In some embodiments, the openings 117 accommodate a single wheel arrangement 120. In some embodiments, the openings 117 include a door. In some embodiments, the openings 117 include a brush or flexible flap.

FIGS. 1B and 1C include two possible arrangements for openings in the body to accommodate wheel arrangements 120. One of ordinary skill in the art would recognize that additional opening arrangements are within the scope of this disclosure. For example, in some embodiments, the wheel arrangements are in a tricycle arrangement.

FIG. 2 is a side view of a robot 200 in an entry way in accordance with some embodiments. Robot 200 is similar to robot 100 and same elements have a same reference number. Elements in the robot 200 that are similar to robot 100 are not described herein for the sake of brevity. In comparison with robot 100, the robot 200 includes a first wheel arrangement 220a and a second wheel arrangement 220b, collectively call wheel arrangements 220. While FIG. 2 includes two wheel arrangements 220, one of ordinary skill in the art would recognize that the robot 200 includes more than two wheel arrangements in some embodiments.

The first wheel arrangement 220a includes a first wheel 222a connected to a connector 226a. The first wheel 222a is similar to the first wheel 122 (FIG. 1). The first wheel 222a is connected to the connector 226a in order to move the first wheel 222a between a first position P1 inside of the body 110 and a second position P2 at least partially outside of the body 110. In some embodiments, the second position P2 is completely outside of the body 110. In some embodiments, the second position P2 is partially inside of the body 110.

The first wheel arrangement 220a further includes a second wheel 224a connected to a connector 228a. The second wheel 224a is similar to the second wheel 124 (FIG. 1). The second wheel 224a is connected to the connector 228a to move the second wheel 224a from a position inside of the body 110 to a position at least partially outside of the body 110. Similar to the first wheel 222a, the second wheel 224a is movable to be completely outside of the body 110 or partially outside of the body 110 in various embodiments.

The second wheel arrangement 220b is similar to the first wheel arrangement 220a. Components of the second wheel arrangement 220b that are similar to the first wheel arrangement 220a have a similar reference number with 'a' replaced by 'b.' In comparison with the first wheel arrangement 220a, the second wheel arrangement 220b is on an opposite end of the body 110. The first wheel arrangement 220a and the second wheel arrangement 220b are independently controllable by a controller in the body 110.

Upon detection of the step face 145 the controller within the body 110 controls the first wheel arrangement 220a and the second wheel position 220b to position the robot 100 proximate the step face 145. The controller then controls the first wheel arrangement 220a to deploy the first wheel 222a by translational movement of the connector 226a along a central axis. As a result, the first wheel 22a is moved from the first position P1 to the second position P2. As a result, the first wheel 222a contacts the step 140. In some embodiments, the second position P2 is a predetermined position at least partially outside of the body 110. In some embodiments, the second position P2 is determined during deployment of the first wheel 222a in order to maintain the body 110 in a level state to reduce a risk of toppling the package. Once the first wheel 222a is able to support the body 110, the controller controls the second wheel 224a to retract to a position inside of the body 110 to help prevent debris from the second wheel 224a being deposited on the step 140. Following retraction of the second wheel 224a, the controller controls the first wheel arrangement 220a and the second wheel arrangement 220b to move the robot 200 so that the second wheel arrangement 220b is proximate the step face 145. The deployment process described above with respect to the first wheel arrangement 220a is then repeated for the second wheel arrangement 220b.

Once both the first wheel arrangement 220a and the second wheel arrangement 220b are over the step 140, the robot 200 will proceed into the other areas of the dwelling on the first wheel 222a and the first wheel 222b to a location within the dwelling where the package is to be delivered. The robot 200 then returns to the step 140. The robot 200 then traverses the step 140 to return to the floor 130 and deploys the second wheel 224a and the second wheel 224b in a reverse manner to that described above with respect to deployment of the first wheel 222a and the first wheel 222b. The robot 200 then exits the dwelling and either returns to the distribution center or to a next dwelling along a delivery route.

While the above description refers to translation style movement of the wheels in the wheel arrangements 220, one of ordinary skill in the art would recognize that rotational movement is also possible. Additionally, while the first wheel 222a in FIG. 2 is directly in front of the second wheel 224a, in some embodiments, the first wheel 222a is offset from the second wheel 224a in a direction into the page of FIG. 2.

Figure 3:
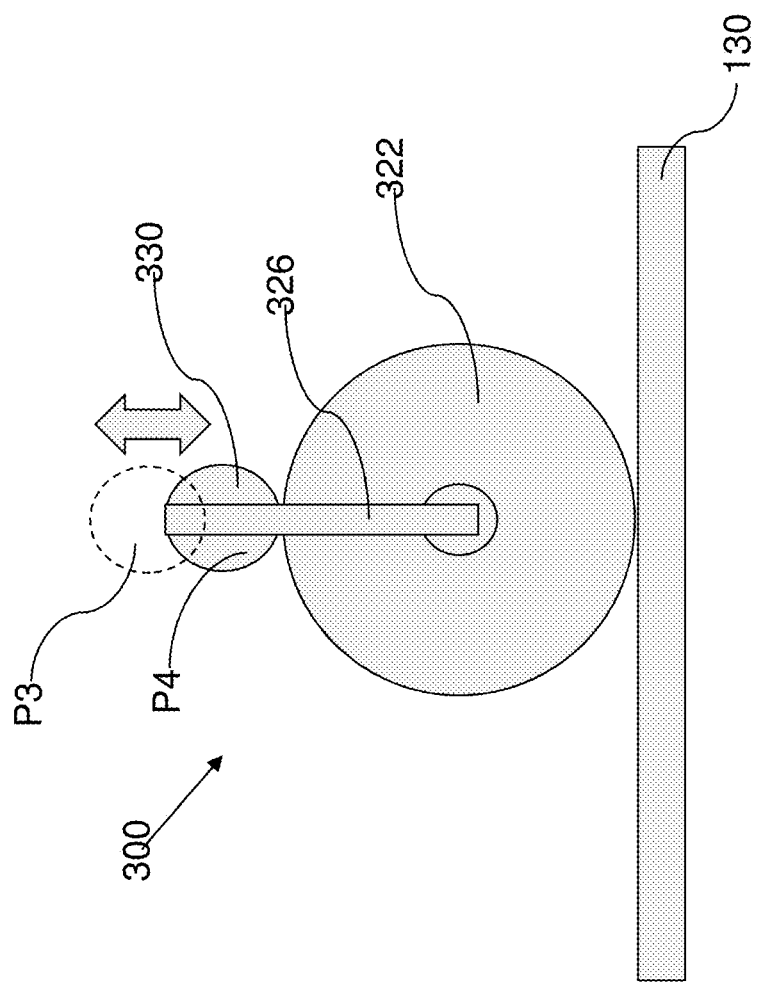
FIG. 3 is a side view of a wheel arrangement for a robot in accordance with some embodiments.

FIG. 3 is a side view of a wheel arrangement 300 for a robot in accordance with some embodiments. The wheel arrangement 300 includes a wheel 322 connected to a connector 326. A brush 330 is also connected to the connector 326 and is moveable between a third position P3 above the wheel 322 to a fourth position P4 in contact with the wheel 322. The brush 330 is configured to rotate relative to the wheel 322 in order to remove debris from the wheel 322 in order to reduce the risk of the wheel 322 conveying debris into the dwelling. In some embodiments, the wheel 322 is similar to the first wheel 122 (FIG. 1).

While the above description refers to translation style movement of the brush 330, one of ordinary skill in the art would recognize that rotational movement is also possible. Additionally, while brush 330 is position directly above the wheel in FIG. 3, in some embodiments, a center of the brush 330 is offset from a center of the wheel 322.

The wheel arrangement 300 is usable in both the robot 100 (FIG. 1) and the robot 200 (FIG. 2). In some embodiments, the wheel arrangement 300 is used to clean a wheel located inside of the body 110. For example, in some embodiments, the wheel arrangement 300 is used to clean the first wheel 222a in the first position P1 (FIG. 2); or the first wheel 122 inside of the body 110 (FIG. 1). In some embodiments, the wheel arrangement 300 is used to clean a wheel located outside of the body 110. For example, in some embodiments, the wheel arrangement 300 is used to clean the second wheel 124 located in a deployed position in contact with the floor 130 (FIG. 1); or the first wheel 222a in the position P2 (FIG. 2).

The wheel arrangement 300 is also usable in place of the wheel arrangement 120 (FIG. 1) or the wheel arrangements 220 (FIG. 2). For example, in some embodiments, the wheel arrangement 300 is used to clean a single wheel prior to the robot 100 (FIG. 1) or the robot 200 (FIG. 2) entering the dwelling.

For example, upon detection of the step face 145 the controller within the body 110 controls the brush 330 to contact the wheel 322 and the wheel 322 is rotated for the brush 330 to remove debris from the wheel 322. In some embodiments, the brush 330 is moved to be in contact with the wheel 322. In some embodiments, the wheel 322 is moved to be in contact with the brush 330. In some embodiments, both the wheel 322 and the brush 330 are moved. Following the removal of debris from the wheel 322, the robot 100 or the robot 200 equipped with the wheel arrangement 300 will proceed into the other areas of the dwelling. The brush 330 is not used to clean debris from the wheel 322 upon return to the step face 145 following delivery of the package in order to reduce the amount of debris in the dwelling.

FIG. 4 is a side view of a wheel arrangement 400 for a robot in accordance with some embodiments. The wheel arrangement 400 includes a wheel 422 connected to a connector 426. A cover 440 is around an outer circumference of the wheel 422. The cover 440 is placed on the wheel 422 upon entry of a robot, e.g., the robot 100 (FIG. 1) or the robot 200 (FIG. 2), into the dwelling in order to reduce the risk of the wheel 422 conveying debris into the dwelling. In some embodiments, the wheel 422 is similar to the first wheel 122 (FIG. 1).

The wheel arrangement 400 is usable in both the robot 100 (FIG. 1) and the robot 200 (FIG. 2). In some embodiments, the wheel arrangement 400 is used for the first wheel 122 (FIG. 1) or the first wheel 222a/222b (FIG. 2). In some embodiments, the cover 440 is placed on the wheel 422 at the distribution center. Placing the cover 440 on the wheel 422 at the distribution center helps to prevent debris picked up by the wheel 422 from previous deliveries being conveyed to the dwelling for a subsequent delivery. In some embodiments, the cover 440 is placed over the wheel 422 using a machine installed at the dwelling. In some embodiments, the robot 100 (FIG. 1) or the robot 200 (FIG. 2) instructions a recipient of the package to cover the wheel 422 with the cover 440. In some embodiments, the instruction is provided by a speaker or a display.

The wheel arrangement 400 is also usable in conjunction with the wheel arrangement 300 (FIG. 3). For example, in some embodiments, the wheel arrangement 300 is usable to clean a wheel and then the cover 440 is placed over the clean wheel.

The wheel arrangement 400 is also usable in place of the wheel arrangement 120 (FIG. 1), the wheel arrangements 220 (FIG. 2), or the wheel arrangement 300 (FIG. 3). For example, in some embodiments, the wheel arrangement 400 is used to cover a single wheel prior to the robot 100 (FIG. 1) or the robot 200 (FIG. 2) entering the dwelling, e.g., using a machine installed at the dwelling or by instructing the recipient to place the cover 440 over the wheel 422.

Figure 5B:
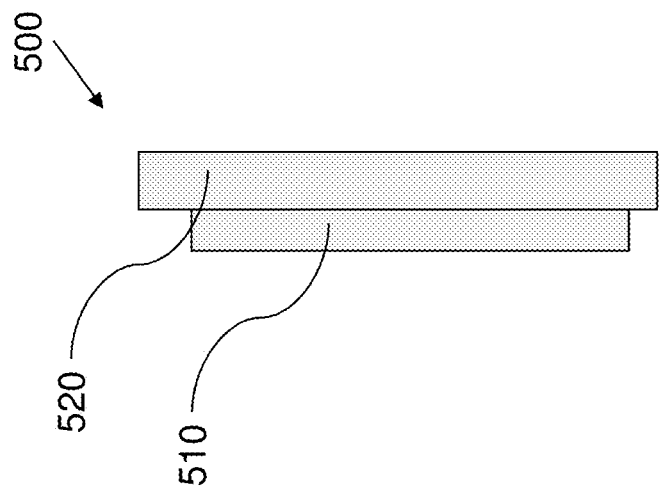
FIG. 5B is a front view of a wheel for a robot in accordance with some embodiments.
Figure 5A:
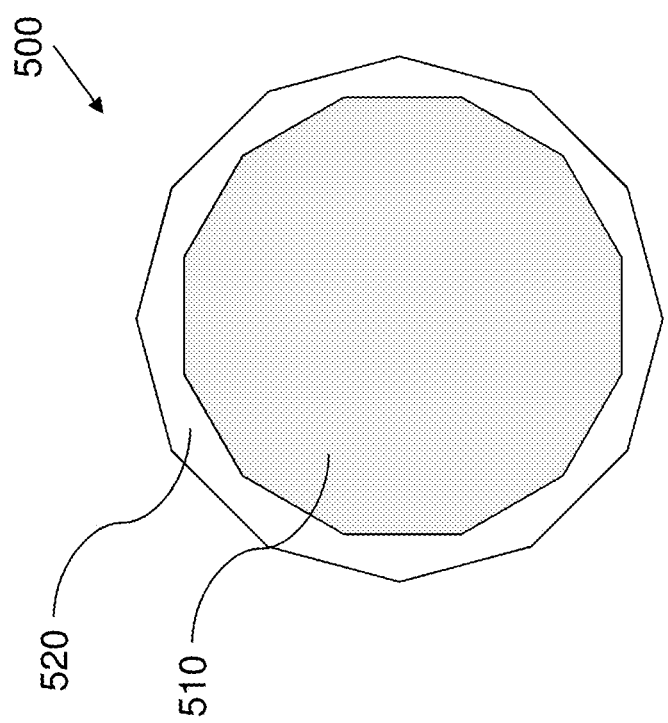
FIG. 5A is a side view of a wheel for a robot in accordance with some embodiments.

FIG. 5A is a side view of a wheel 500 in accordance with some embodiments. The wheel 500 includes an inner wheel 510 and an outer wheel 520. In some embodiments, wheel 500 is usable in the wheel arrangement 120 (FIG. 1), in the wheel arrangements 200 (FIG. 2), in the wheel arrangement 300 (FIG. 3), or in the wheel arrangement 400 (FIG. 4). The wheel 500 is usable for example where a track system, e.g., a raised track system, is usable by a robot to travel from the distribution center to the dwelling. In such a track system, the smaller diameter inner wheel 510 contacts the track while the larger diameter outer wheel 520 is kept apart from the track in order to reduce accumulation of debris on the outer wheel. 520. Thus, when the robot enters the dwelling using the outer wheel 520 to contact the floor of the dwelling, a risk of debris from the wheel 500 being conveyed to the floor of the dwelling is decreased.

FIG. 5B is a front view of the wheel 500 in accordance with some embodiments. In some embodiments, the outer wheel 520 is closer to a center portion of the body 110 (FIG. 1). In some embodiments, the inner while 510 is closer to the center portion of the body 110 (FIG. 1).

One of ordinary skill in the art would recognize that the wheel 500 is usable with any of the above described wheel arrangements 120, 220, 300 or 400.

Figure 6:
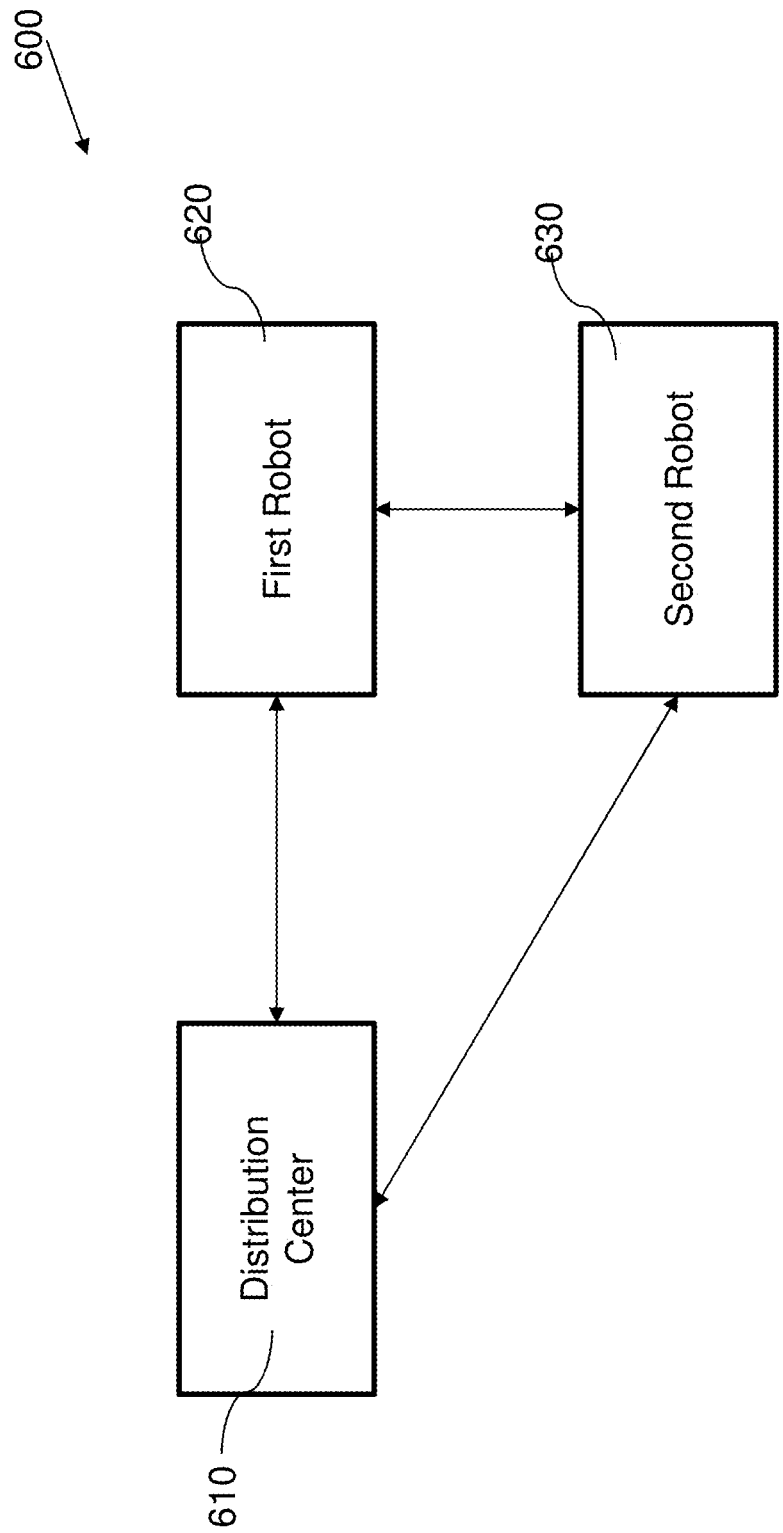
FIG. 6 is a schematic view of a system for controlling a robot in accordance with some embodiments.

FIG. 6 is a schematic view of a system 600 for controlling a robot in accordance with some embodiments. The system 600 includes a distribution center 610 capable of communicating with a first robot 620 and a second robot 630. Additionally, the first robot 620 is also capable of communicating with the second robot 630. Communication amongst the distribution center 610, the first robot 620 and the second robot 630 is possible using wireless and/or wired communication.

The distribution center 610 is able to communicate with the first robot 620 and the second robot 630 in order to convey information such as address, package information, routing information and delivery instructions. The first robot 620 and the second robot 630 are able to communicate with the distribution center 610 in order to convey information such as delivery status, position and operational status of the robot. In some embodiments, delivery of the package includes a robot opening a door to a dwelling. In some embodiments, the first robot 620 and the second robot 630 communicate with the distribution center 610 in order to receive information for opening the door of the dwelling; or to provide a notification to the distribution center 610 that a request to open the door failed. In some embodiments, following a notification that a request to open the door failed, either the distribution center 610 or the corresponding first robot 620 or second robot 630 notifies the recipient of the failure to open the door. In some embodiments, the notification is transmitted to a mobile terminal of the recipient to cause the mobile terminal display an alert to the recipient.

The first robot 620 is able to communicate with the second robot 630 in order to provide updates for travel conditions. For example, if a pathway is blocked that prevents movement along the pathway, the robots are able to share such information. In some embodiments, each of the first robot 620 and the second robot 630 will have a package for a same recipient and the robots will coordinate delivery times in order to minimize disruption to the dwelling of the recipient. The first robot 620 and the second robot 630 are selectable from any of the robot 100 (FIG. 1), the robot 200 (FIG. 2), or any of the robot 100 or the robot 200 modified to include the wheel arrangement 300 (FIG. 3), the wheel arrangement 400 (FIG. 4) or the wheel 500 (FIG. 5A).

Figure 7:
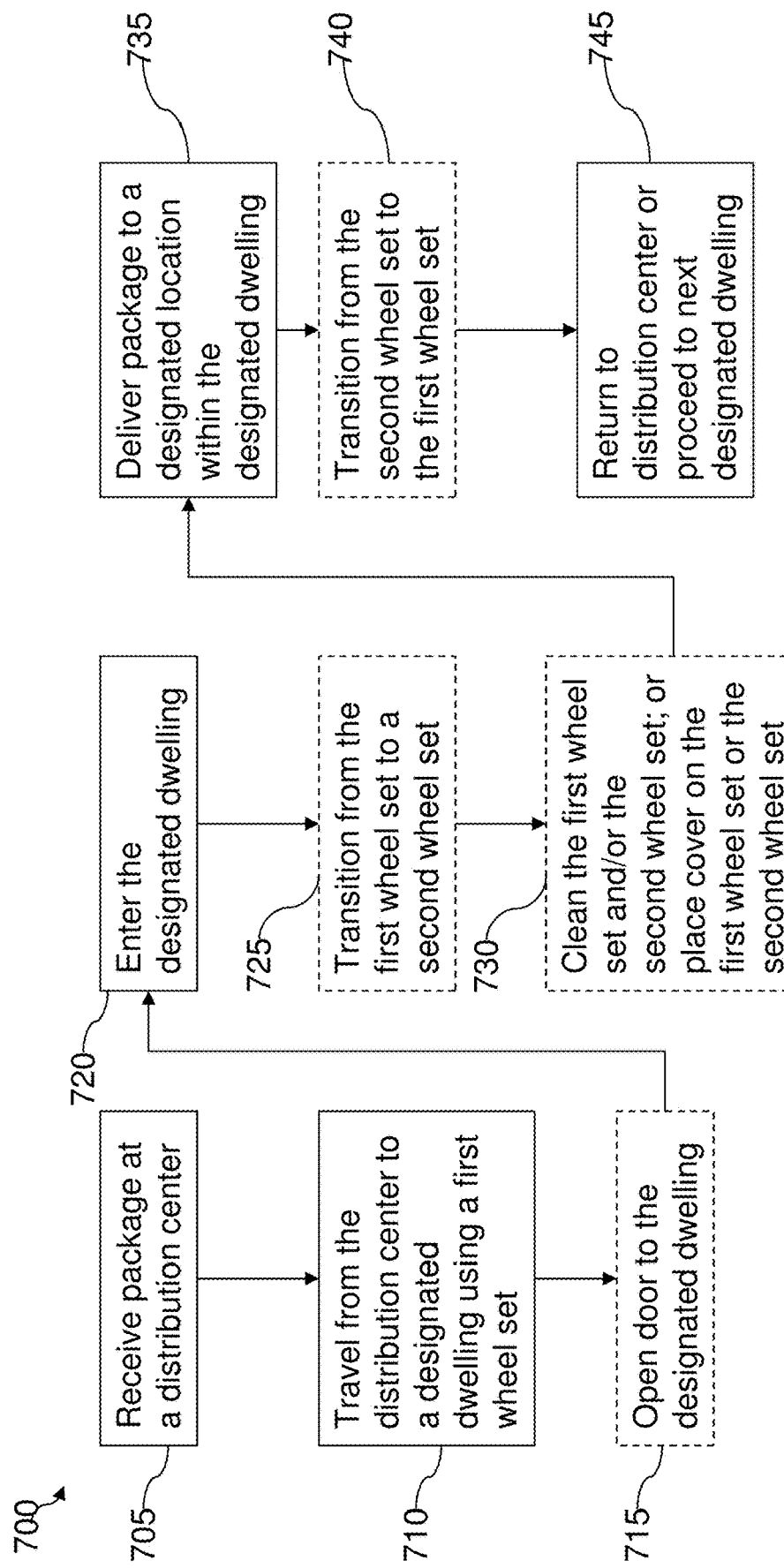
FIG. 7 is a flow chart of a method of delivering a package using a robot in accordance with some embodiments.

FIG. 7 is a flow chart of a method 700 of delivering a package in accordance with some embodiments. The method 700 is capable of being implemented by any of the robot 100 (FIG. 1), the robot 200 (FIG. 2), or any of the robot 100 or the robot 200 modified to include the wheel arrangement 300 (FIG. 3), the wheel arrangement 400 (FIG. 4) or the wheel 500 (FIG. 5A).

In operation 705, a robot receives a package at a distribution center. In some embodiments, the robot receives the package by the package being secured to an outer surface of the robot. In some embodiments, the robot receives the package by the package being placed inside of a body of the robot. In some embodiments, the robot will receive multiple packages. In some embodiments, different packages are placed in different compartments within the body of the robot. For example, in some embodiments, one package is placed in a cooler compartment in the body and another package is placed in a compartment other than the cooler compartment. At the time that the robot receives the package the robot also receives delivery instructions including address information associated with the package.

In operation 710, the robot travels from the distribution center to a designated dwelling using a first wheel set. The designated dwelling is determined based on the received delivery instructions. A route from the distribution center to the designated dwelling is determine based on a location of the designated dwelling and the detected position of the robot. In some embodiments, the route is adjusted during transit based on updated information along the route. In some embodiments, the first wheel set corresponds to the second wheel 124 (FIG. 1), the second wheels 224a and 224b (FIG. 2) or modified versions based on the wheel arrangement 300 (FIG. 3), the wheel arrangement 400 (FIG. 4) or the wheel 500 (FIG. 5A).

In optional operation 715, the robot or the distribution center sends a signal to the dwelling to open a door to the dwelling. In some embodiments, the signal is transmitted wirelessly or via a wired connection. In some embodiments, the signal is transmitted using radio frequency, infrared frequency or another suitable frequency. In some embodiments, the door opens automatically in response to transmission of an authentication code from the robot in response to an authentication request sent by a device associated with the dwelling, such as a doorbell. In some embodiments, the robot or the distribution center transmits an alert to the recipient of the package to open the door and the recipient opens the door either manually or remotely. In some embodiments, the optional operation 715 is omitted in situations where the package is to be delivered to an exterior of the dwelling. A determination is made for whether the package is be delivered to the exterior of the dwelling based on the delivery instructions, in some embodiments.

In operation 720, the robot enters the designated dwelling. The robot enters the dwelling using the first wheel set. In some embodiments, the robot enters the dwelling until a step or threshold, such as step face 145 (FIG. 1), is detected.

In optional operation 725, the robot transitions from the first wheel set to a second wheel set. In some embodiments, the second wheel set corresponds to the first wheel 122 (FIG. 1), the first wheels 222a and 222b (FIG. 2) or modified versions based on the wheel arrangement 300 (FIG. 3), the wheel arrangement 400 (FIG. 4) or the wheel 500 (FIG. 5A). In some embodiments, the transition from the first wheel set to the second wheel set is in response to detection of the step or the threshold, such as step face 145 (FIG. 1). The transition from the first wheel set to the second wheel set is performed in the manner described above with respect to the various embodiments. In some embodiments, the operation 725 is omitted when the robot includes a single wheel set. In some embodiments, the optional operation 725 is performed prior to operation 720 in response to the step or threshold coinciding with the location of the door for the dwelling.

In optional operation 730, the first wheel set and/or the second wheel set are cleaned; or a cover is placed on the first wheel set or the second wheel set. In some embodiments, the first wheel set and/or the second wheel set are cleaned using a rotatable brush, such as brush 330 (FIG. 3), or by the wheel set passing through a brush or flexible flap opening, such as openings 115 (FIG. 1B) or openings 117 (FIG. 1C). In some embodiments, the cover is placed on the first wheel set or the second wheel set by a machine at the dwelling. In some embodiments, the cover is placed on the first wheel set or the second wheel set by a recipient of the package in response to instructions from the robot using a speaker or display. In some embodiments, the cover is placed on the second wheel set at the distribution center prior the robot leaving the distribution center. In some embodiments, operation 730 is omitted when the wheel arrangement 300 (FIG. 3) or the wheel arrangement 400 (FIG. 4) are not in use. In some embodiments, operation 730 occurs prior to the operation 710 when the cover is placed on the second wheel set at the distribution center. In some embodiments, the operation 730 occurs prior to operation 720 where the first wheel set and/or the second wheel set is cleaned prior to the robot entering the dwelling to reduce conveyance of debris into the dwelling.

In operation 735, the package is delivered to a designated location inside the designated dwelling. The robot moves to the designated location on the second wheel set; a cleaned first wheel set or second wheel set; or a covered first wheel set or second wheel set. The designated location is determined based on the delivery instructions. In some embodiments, the robot includes a conveyor, such as an arm or a conveyor belt, to remove the package from the robot. In some embodiments, the robot provides instructions to the recipient, such as by a speaker or a display, for the recipient to remove the package from the robot. In some embodiments, the robot includes a scanner configured to scan a removed package to help ensure the proper package is delivered to the dwelling. In some embodiments, a delivery confirmation message is sent to the distribution center following delivery of the package.

In optional operation 740, the robot transitions from the second wheel set to the first wheel set. In some embodiments, the transition from the second wheel set to the first wheel set is in response to detection of the step or the threshold, such as step face 145 (FIG. 1). The transition from the second wheel set to the first wheel set is performed in the manner described above with respect to the various embodiments. In some embodiments, the operation 740 is omitted when the robot includes a single wheel set.

In operation 745, the robot returns to the distribution center or proceeds to a next designated dwelling. In some embodiments, the robot returns to the distribution center when the robot contains no further packages for delivery. In some embodiments, the robot proceeds to the next designated dwelling based on delivery instructions associated with an additional package for delivery.

One of ordinary skill in the art would recognize that method 700 includes additional operations in some embodiments. For example, in some embodiments, the method 700 includes an operation for capturing an image of the closed door to the dwelling following delivery of the package to notify the recipient that the door was properly closed following delivery. In some embodiments, operations of method 700 are omitted, such as those described above. In some embodiments, an order of operation of the method 700 is modified, such as the different order of operations described above.

Figure 8:
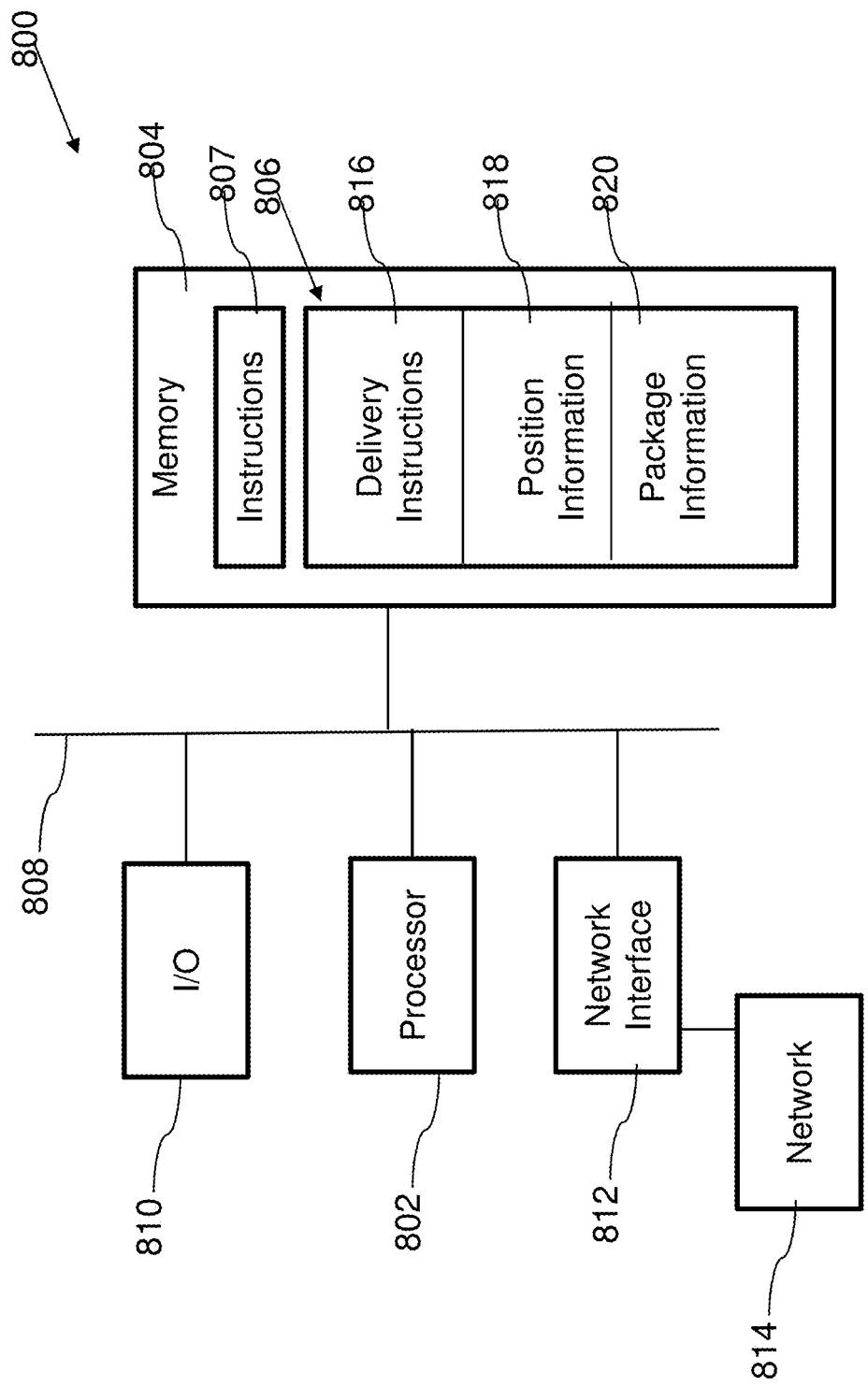
FIG. 8 is a block diagram of a controller in accordance with some embodiments.

FIG. 8 is a schematic view of a controller 800 in accordance with some embodiments. The controller 800 is usable as a controller in a robot, such as the robot 100 (FIG. 1) or the robot 200 (FIG. 2), or in a distribution center, such as distribution center 610 (FIG. 6). The controller 800 includes a hardware processor 802 and a non-transitory, computer readable storage medium 804 encoded with, i.e., storing, the computer program code 806, i.e., a set of executable instructions. Computer readable storage medium 804 is also encoded with instructions 807 for interfacing with manufacturing machines for producing the memory array. The processor 802 is electrically coupled to the computer readable storage medium 804 via a bus 808. The processor 802 is also electrically coupled to an I/O interface 810 by bus 808. A network interface 812 is also electrically connected to the processor 802 via bus 808. Network interface 812 is connected to a network 814, so that processor 802 and computer readable storage medium 804 are capable of connecting to external elements via network 814. The processor 802 is configured to execute the computer program code 806 encoded in the computer readable storage medium 804 in order to cause the controller 800 to be usable for performing a portion or all of the operations as described in method 700 and/or the operations described above with respect to FIGS. 1-6.

In some embodiments, the processor 802 is a central processing unit (CPU), a multi-processor, a distributed processing system, an application specific integrated circuit (ASIC), and/or a suitable processing unit.

In some embodiments, the computer readable storage medium 804 is an electronic, magnetic, optical, electromagnetic, infrared, and/or a semiconductor system (or apparatus or device). For example, the computer readable storage medium 804 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 804 includes a compact disk-read only memory (CD-ROM), a compact disk-read/write (CD-R/W), and/or a digital video disc (DVD).

In some embodiments, the storage medium 804 stores the computer program code 806 configured to permit operation of the controller 800. In some embodiments, the storage medium 804 also stores information needed for the controller 800 to operation and information generated during operation of the controller 800, such as a delivery instructions parameter 816, a position information parameter 818, a package information parameter 820 and/or a set of executable instructions for operating the controller 800.

In some embodiments, the storage medium 804 stores instructions 807 for interfacing with external devices, such as a door to the dwelling or a mobile terminal associated with a recipient. The instructions 807 enable processor 802 to generate instructions readable by the external devices.

System 800 includes I/O interface 810. I/O interface 810 is coupled to external circuitry. In some embodiments, I/O interface 810 includes a keyboard, keypad, mouse, trackball, trackpad, and/or cursor direction keys for communicating information and commands to processor 802.

The controller 800 also includes network interface 812 coupled to the processor 802. Network interface 812 allows the controller 800 to communicate with network 814, to which one or more other computer systems are connected. Network interface 812 includes wireless network interfaces such as BLUETOOTH, WIFI, WIMAX, GPRS, or WCDMA; or wired network interface such as ETHERNET, USB, or IEEE-1394. In some embodiments, the processes described above in FIGS. 1-7 are implemented in two or more controllers 800, and information such as delivery instructions, package information and position information are exchanged between different controllers 800 via network 514.

An aspect of this description relates to a robot. The robot includes a body having an internal opening. The robot further includes a first wheel configured to deploy out of the internal opening and to retract into the internal opening. The robot further includes a second wheel configured to deploy out of the internal opening and to retract into the internal opening. The robot further includes a sensor configured to determine a location of the robot. The robot further includes a controller configured to control each of the first wheel and the second wheel, wherein in response to the location of the robot being at a predetermined location, the controller is configured to cause the second wheel to deploy out of the internal opening and to cause the first wheel to retract into the internal opening. In some embodiments, the robot further includes a door, wherein the door is configured to open in response to the second wheel deploying out of the internal opening. In some embodiments, the door is configured to close in response to the first wheel retracting into the internal opening. In some embodiments, the robot further includes a brush enclosure, wherein the first wheel is configured to pass through the brush enclosure during retracting into the internal opening. In some embodiments, the robot further includes a cleaning mechanism, wherein at least one of the first wheel or the second wheel is configured to contact the cleaning mechanism. In some embodiments, the at least one first wheel or second wheel is configured to rotate while in contact with the cleaning mechanism. In some embodiments, the sensor is configured to determine the location of the robot based on at least one of a radio frequency identification (RFID) tag, optical sensing, or infrared sensing. In some embodiments, the controller is configured to rotate the second wheel to deploy the second wheel out of the internal opening. In some embodiments, the controller is configured to rotate the first wheel to retract the first wheel into the internal opening. In some embodiments, the controller is configured to rotate the first wheel simultaneously with rotating of the second wheel. In some embodiments, the controller is configured to translate the second wheel to deploy the second wheel out of the internal opening.

An aspect of this description relates to a robot. The robot includes a body having an opening for receiving a package. The robot further includes a first wheel configured to deploy out of the body and to retract into the body. The robot further includes a second wheel configured to deploy out of the body and to retract into the body. The robot further includes a controller configured to control each of the first wheel and the second wheel. The controller is configured to control the first wheel to propel the robot from a first location to a second location, wherein the second location is a dwelling, detect a presence of a step or threshold at the dwelling, cause the second wheel to deploy out of the body in response to detection of the step or threshold, and cause the first wheel to retract into the body in response to detection of the step or threshold. In some embodiments, in a retracted position, the second wheel is aligned in a vertical direction with the first wheel. In some embodiments, in a retracted position, the second wheel is offset from the first wheel in a horizontal direction. In some embodiments, the controller is configured to cause the first wheel to retract simultaneously with causing the second wheel to deploy. In some embodiments, the controller is configured to cause the first wheel to retract after causing the second wheel to deploy. In some embodiments, the robot further includes a cover around an outer circumference of the second wheel. In some embodiments, the second wheel is configured to deploy while maintaining the second cover around the outer circumference. In some embodiments, the robot further includes a cleaning mechanism, wherein the cleaning mechanism is configured to remove debris from at least one of the first wheel or the second wheel.

An aspect of this description relates to a robot. The robot further includes a body having an opening for receiving a package. The robot further includes a first wheel attached to the body. The robot further includes a cleaning mechanism, wherein the cleaning mechanism is movable relative to the first wheel. The robot further includes a controller configured to control each of the first wheel and the cleaning mechanism. The controller is configured to control the first wheel to propel the robot from a first location to a second location, wherein the second location is a dwelling, detect a presence of a step or threshold at the dwelling, cause the cleaning mechanism to move to be in contact with the first wheel in response to detection of the step or threshold, and cause the first wheel or the cleaning mechanism to rotate in response to the cleaning mechanism contacting the first wheel.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A robot comprising:
   a body having an internal opening;
   a first wheel configured to deploy out of the internal opening and to retract into the internal opening using translational movement;
   a second wheel configured to deploy out of the internal opening and to retract into the internal opening using translational movement;
   a sensor configured to determine a location of the robot; and
   a controller configured to control each of the first wheel and the second wheel, wherein in response to the location of the robot being at a predetermined location, the controller is configured to cause the second wheel to deploy out of the internal opening and to cause the first wheel to retract into the internal opening.

2. The robot of claim 1, further comprising a door, wherein the door is configured to open in response to the second wheel deploying out of the internal opening.

3. The robot of claim 2, wherein the door is configured to close in response to the first wheel retracting into the internal opening.

4. The robot of claim 1, further comprising a brush enclosure, wherein the first wheel is configured to pass through the brush enclosure during retracting into the internal opening.

5. The robot of claim 1, further comprising a cleaning mechanism, wherein at least one of the first wheel or the second wheel is configured to contact the cleaning mechanism, and the cleaning mechanism is moveable relative to the first wheel or the second wheel.

6. The robot of claim 5, wherein the at least one first wheel or second wheel is configured to rotate while in contact with the cleaning mechanism.

7. The robot of claim 1, wherein the sensor is configured to determine the location of the robot based on at least one of a radio frequency identification (RFID) tag, optical sensing, or infrared sensing.

8. The robot of claim 1, wherein the controller is configured to rotate the second wheel to deploy the second wheel out of the internal opening.

9. The robot of claim 8, wherein the controller is configured to rotate the first wheel to retract the first wheel into the internal opening.

10. The robot of claim 9, wherein the controller is configured to rotate the first wheel simultaneously with rotating of the second wheel.

11. The robot of claim 1, wherein the controller is configured to deploy the second wheel from inside the body to outside the body through the internal opening.

12. A robot comprising:
    a body having an opening for receiving a package;
    a first wheel configured to deploy out of the body and to retract into the body using translational movement;
    a second wheel configured to deploy out of the body and to retract into the body using translational movement;
    a brush enclosure, wherein the first wheel or the second wheel is configured to contact the brush enclosure; and
    a controller configured to control each of the first wheel and the second wheel, wherein the controller is configured to:
      control the first wheel to propel the robot from a first location to a second location, wherein the second location is a dwelling,
      detect a presence of a step or threshold at the dwelling,
      cause the second wheel to deploy out of the body in response to detection of the step or threshold, and
      cause the first wheel to retract into the body in response to detection of the step or threshold.

13. The robot according to claim 12, wherein in a retracted position, the second wheel is aligned in a vertical direction with the first wheel.

14. The robot according to claim 12, wherein in a retracted position, the second wheel is offset from the first wheel in a horizontal direction.

15. The robot according to claim 12, wherein the controller is configured to cause the first wheel to retract simultaneously with causing the second wheel to deploy.

16. The robot according to claim 12, wherein the controller is configured to cause the first wheel to retract after causing the second wheel to deploy.

17. The robot according to claim 12, further comprising a cover around an outer circumference of the second wheel.

18. The robot according to claim 17, wherein the second wheel is configured to deploy while maintaining the second cover around the outer circumference.

19. The robot according to claim 12, further comprising a cleaning mechanism, wherein the cleaning mechanism is configured to remove debris from at least one of the first wheel or the second wheel.

20. A robot comprising:
a body having an opening for receiving a package;
a first wheel attached to the body;
a cleaning mechanism, wherein the cleaning mechanism is movable relative to the first wheel; and
a controller configured to control each of the first wheel and the cleaning mechanism, wherein the controller is configured to:
control the first wheel to propel the robot from a first location to a second location, wherein the second location is a dwelling,
detect a presence of a step or threshold at the dwelling,
cause the cleaning mechanism to move to be in contact with the first wheel in response to detection of the step or threshold, and
cause the first wheel or the cleaning mechanism to rotate in response to the cleaning mechanism contacting the first wheel.

* * * * *